US009419699B2

(12) United States Patent
Garrett et al.

(10) Patent No.: US 9,419,699 B2
(45) Date of Patent: Aug. 16, 2016

(54) MU-MIMO PROTOCOL EFFICIENCY (71) Applicant: BROADCOM CORPORATION, Irvine, CA (US)

(72) Inventors: David Christopher Garrett, Tustin, CA (US); Jun Zheng, San Diego, CA (US); Nihar Jindal, Mountain View, CA (US)

(73) Assignee: BROADCOM CORPORATION, Irvine, CA (US)

( * ) Notice: Subject to any disclaimer, the term of this patent is extended or adjusted under 35 U.S.C. 154(b) by 91 days.

(21) Appl. No.: 14/243,802

(22) Filed: Apr. 2, 2014

(65) Prior Publication Data

US 2015/0222346 A1    Aug. 6, 2015

Related U.S. Application Data

(60) Provisional application No. 61/936,282, filed on Feb. 5, 2014.

(51) Int. Cl.
*H04W 4/00* (2009.01)
*H04B 7/06* (2006.01)
*H04B 7/04* (2006.01)
(52) U.S. Cl.
CPC ............ *H04B 7/0623* (2013.01); *H04B 7/0452* (2013.01); *H04B 7/0617* (2013.01); *H04B 7/0626* (2013.01)

(58) Field of Classification Search
None
See application file for complete search history.

(56) References Cited

U.S. PATENT DOCUMENTS

| 2013/0107916 | A1* | 5/2013 | Liu ...................... H04B 7/0452 375/219 |
| 2013/0223427 | A1* | 8/2013 | Sohn et al. ..................... 370/338 |
| 2014/0293916 | A1* | 10/2014 | Sohn ...................... H04L 1/0025 370/329 |
| 2015/0023308 | A1* | 1/2015 | Seok .................... H04B 7/0452 370/329 |

FOREIGN PATENT DOCUMENTS

| EP | 2587689 A2 | 5/2013 |
| WO | WO-2012/093794 A2 | 7/2012 |
| WO | WO-2012/111939 A2 | 8/2012 |

\* cited by examiner

*Primary Examiner* — Otis L Thompson, Jr.
(74) *Attorney, Agent, or Firm* — McDermott Will & Emery LLP (57) ABSTRACT

A method for improving multiple-user (MU) multiple-input-multiple-output (MIMO) protocol efficiency includes transmitting an MU frame to multiple devices. The MU frame is beamformed to enable a corresponding one of the devices to receive an intended stream at high power. The MU frame includes an additional sounding-field. Acknowledgement (ACK) responses are received from at least some of the plurality of devices. Each of the ACK responses includes a sounding response frame including a channel feedback.

20 Claims, 7 Drawing Sheets

MU-MIMO PROTOCOL EFFICIENCY

CROSS-REFERENCE TO RELATED APPLICATIONS

This application claims the benefit of priority under 35 U.S.C. §119 from U.S. Provisional Patent Application 61/936,282 filed Feb. 5, 2014, which is incorporated herein by reference in its entirety.

TECHNICAL FIELD

The present description relates generally to wireless communications, and more particularly, but not exclusively, to improving multiple-user (MU)-multiple-input-multiple-output (MIMO) protocol efficiency.

BACKGROUND

In radio-frequency (RF) communications, multiple-input-multiple-output (MIMO) refers to using multiple antennas at both the transmitter and the receiver ends to enhance communication performance. The terms input and output in MIMO denote the radio channels that carry the input and output signals received by or transmitted from a communication device (e.g., a transceiver). MIMO, which is an important portion of modern wireless communication standards such as IEEE 802.11n (e.g., Wi-Fi), 4G, 3GPP Long Term Evolution (LTE), IEEE 802.16e (e.g., WiMAX), and others, can significantly increase data throughput and link range without the need for additional bandwidth or increased transmission power. Three main categories of MIMO include spatial multiplexing, diversity coding, and precoding.

In precoding, multiple streams of signals are generated by beamforming. This is in contrast with the conventional single-stream beamforming, where the same signal is transmitted by each of the multiple antennas with independent and appropriate phase and gain weightings, such that the signal power is maximized at a receive end (e.g., an antenna of a multiple-antenna receiver). However, in order to simultaneously maximize the signal level at a number of receive ends (e.g., more than one antenna of a multiple-antenna receiver), multi-user (MU)-MIMO has to be used to generate multiple streams of signals. MU-MIMO, which is part of the IEEE 802.11ac standard, allows a transmitter (e.g., a router such as an access point) to simultaneously transmit data to more than one station (e.g., terminal or user equipment). Each of the multiple streams of data transmitted by the transmitter is intended for one of the stations. The beamforming vectors (e.g., gain and phase matrices) are chosen such that each of the stations receives its intended data streams at high power and receives all non-intended data streams at very low power and/or in particular spatial directions. In order to design such beamforming vectors, the MU-MIMO beamformer must have accurate knowledge of the propagation channel from itself to each of the intended recipients. Such channel knowledge is typically acquired via a feedback process, where the MU-MIMO beamformer transmits a sounding frame, and upon reception of this sounding frame each user terminal estimates the channel from the MU-MIMO beamformer to itself. In the next stage, each of the user terminals transmits its channel estimate (e.g., a quantized channel estimate) back to the MU-MIMO beamformer. Due to the time variation of the propagation channel and the need for very accurate channel knowledge at the beamformer, this process is frequently repeated, and therefore consumes considerable overhead.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and can be practiced using one or more implementations. In one or more instances, well-known structures and components are shown in block diagram form in order to avoid obscuring the concepts of the subject technology.

The subject technology may provide methods and implementations for improving multiple-user (MU) multiple-input-multiple-output (MIMO) protocol efficiency. The disclosed technology greatly reduces the overhead required to enable accurate channel knowledge at the MU-MIMO beamformer (e.g., router or access point), by suitably combining the sounding frame and MU-MIMO data frames, and by suitably combining channel feedback and acknowledgement frames. In one or more implementations, the subject technology can improve the MU-MIMO protocol efficiency by combining, at the router an MU-MIMO frame and a sounding field into a single frame. In response to receiving the single frame, the receiving terminal (e.g., a beamformee), such as a hand-held communication device, a tablet, a laptop, or a personal computer, can send an ACK frame that is combined with a channel feedback. The subject technology drastically reduces overhead by removing the entire NDP announcement (NDPA), NDP, and polling sequences, except at an initialization stage. In some implementations, combining the ACK frame and the channel feedback by the terminal is independent of combining the MU-MIMO frame and the sounding field by the router. In other words, the router may send a single frame including the MU-MIMO frame and the sounding field, and the terminal may respond by separate ACK frame and channel feedback, or the router may send the sounding field and the MU-MIMO frame separately and the terminal responds to both in a single response with a combined ACK frame and channel feedback.

Figure 1:
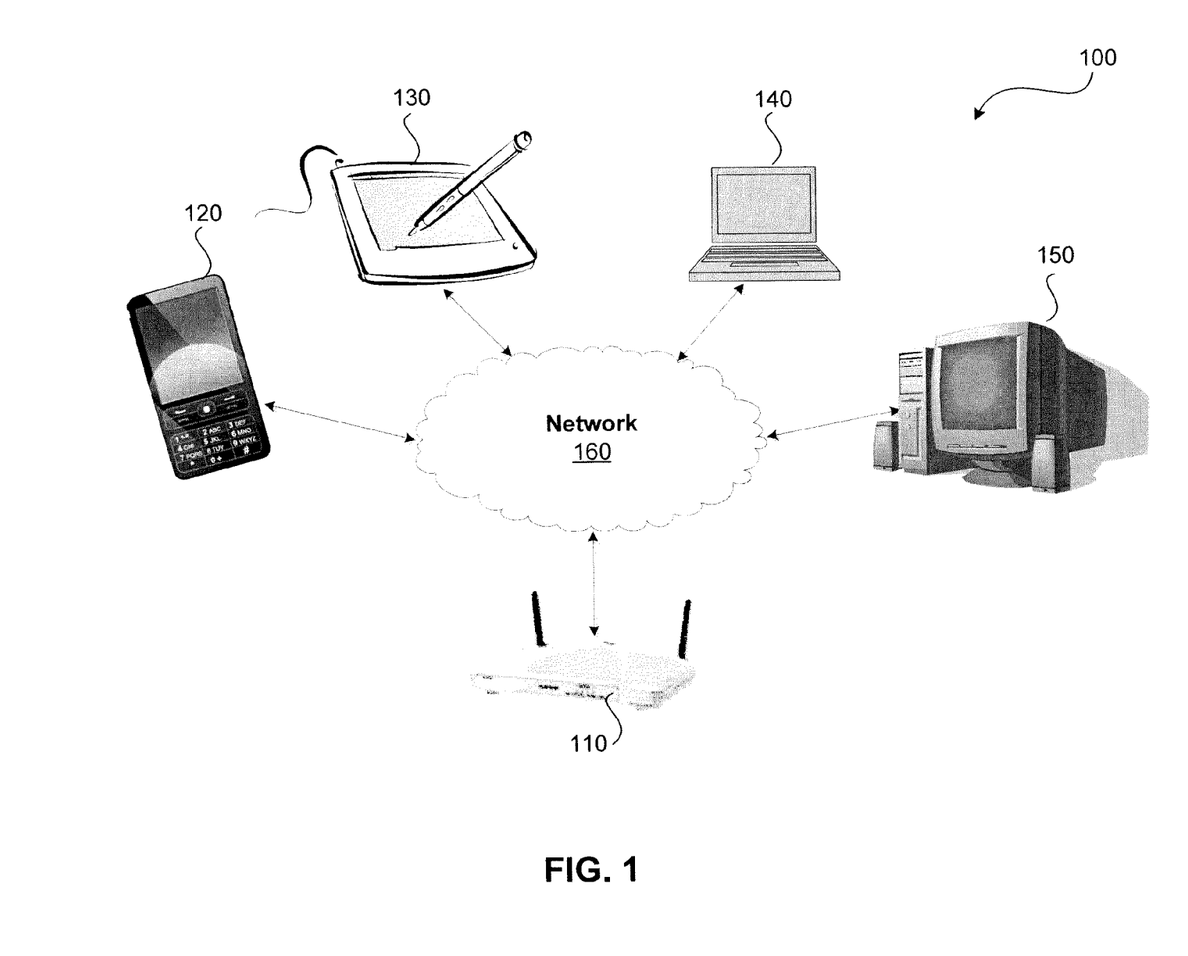
FIG. 1 illustrates an example of a network environment with improved multiple-user (MU)-multiple-input-multiple-output (MIMO) protocol efficiency in accordance with one or more implementations.

FIG. 1 illustrates an example of a network environment 100 with improved multiple-user (MU)-multiple-input-multiple-output (MIMO) protocol efficiency in accordance with one or more implementations of the subject technology. The network environment 100 includes a router 110 (e.g., an access point, such as MU-MIMO beamformer) and a number of stations (e.g., an MU-MIMO beaformee), for example, a hand-held communication device 120, a tablet 130, a laptop 140, or a personal computer 150, communicating via a network 160. The network 160 can be a local area network (LAN), a Wide area network (WAN), a personal area network (PAN), the Internet, or of any other type of network.

In one or more implementations, the router 110 can improve MU-MIMO protocol efficiency as described herein. An MU frame is transmitted to one or more devices (e.g., stations). The MU frame is beamformed and can enable a corresponding one of multiple devices (e.g., an intended recipient) to receive an intended stream at high power. Each MU frame can include an additional sounding-field. The additional sounding-field includes an MU-MIMO long-training field (LTF) sequence, and the MIMO-LTF sequence can be a very-high-throughput (VHT)-LTF sequence, which is added at the end of the MU frame. The additional sounding-field can also include VHT-short-training field (STF) sequence, which is added before the VHT-LTF sequence. In some aspects, the VHT-LTF sequence and the VHT-STF sequence are not beamformed.

In some aspects, at least some of the recipient devices (e.g., one of the stations 120, 130, 140, or 150) of the MU frame sends Acknowledgement (ACK) responses (e.g. ACK frames), in response to the reception of the MU frame. Each of the ACK responses includes a sounding response frame. The sounding response frame includes feedback that, in turn, includes quantized channel state information (CSI) feedback. The router 110 can utilize the CSI feedback to improve beamforming vectors. Improving beamforming vectors results in a spatial null at each station for the stream that is not intended for that station.

In some implementations, the additional sounding field or the frame's preamble includes signaling that identifies a device (e.g., one of 120, 130, 140, or 150) that has to include feedback in a corresponding sounding response frame. The signaling allows the identified device to decide when to include feedback in the corresponding sounding response frame.

Figure 2:
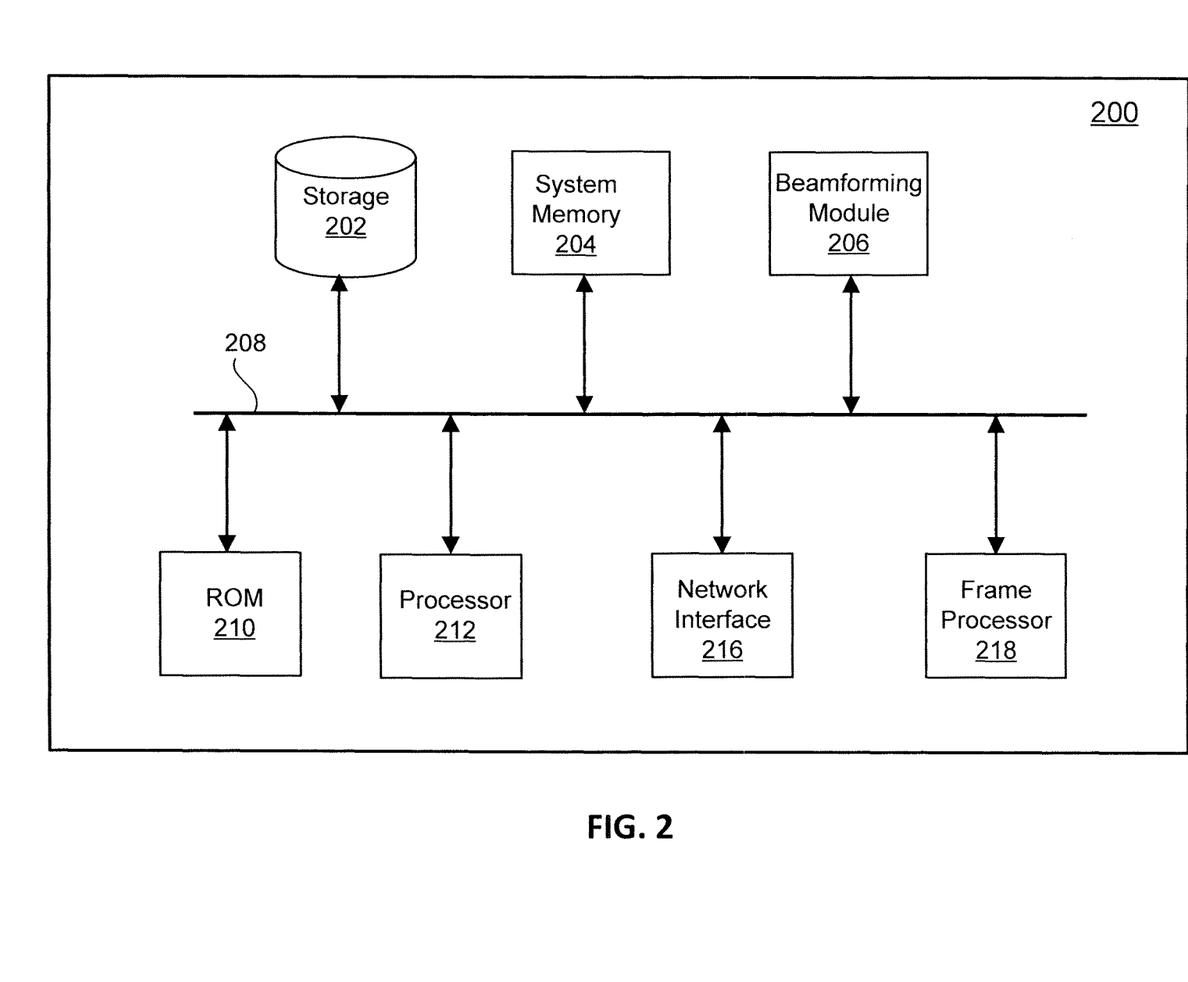
FIG. 2 conceptually illustrates an example of a router with improved MU-MIMO protocol efficiency in accordance with one or more implementations.

FIG. 2 conceptually illustrates an example of a router 200 with improved MU-MIMO protocol efficiency in accordance with one or more implementations of the subject technology. The router 200 is the same as the router 110 of FIG. 1 and is in communication with a number of stations (e.g., 120, 130, 140, or 150 of FIG. 1) via a network (e.g., 160 of FIG. 1). In one or more implementations, the router 200 includes a bus 208, a permanent storage device 202, a system memory 204, a beamforming module 206, read-only memory (ROM) 210, a processing unit(s) 212, a network interface 216, and a frame processor 218, or subsets and variations thereof.

The bus 208 collectively represents all system, peripheral, and chipset buses that communicatively connect the numerous internal devices of router 200. In one or more implementations, the bus 208 communicatively connects processing unit(s) 212 with the ROM 210, the system memory 204, and the permanent storage device 202. From these various memory units, the processing unit(s) 212 retrieves instructions to execute and data to process in order to execute the processes of the subject disclosure. The processing unit(s) can be a single processor or a multi-core processor in different implementation. The ROM 210 stores static data and instructions that are needed by the processing unit(s) 212 and other modules of the router 200. The permanent storage device 202, on the other hand, is a read-and-write memory device. The permanent storage device 202 is a non-volatile memory unit that stores instructions and data even when the router 200 is off.

The system memory 204 is a read-and-write memory device. However, unlike storage device 202, the system memory 204 is a volatile read-and-write memory, such as random access memory. System memory 204 stores any of the instructions and data that the processing unit(s) 212 needs at runtime. In one or more implementations, the processes of the subject disclosure are stored in the system memory 204, the permanent storage device 202, and/or the ROM 210. From these various memory units, the processing unit(s) 212 retrieves instructions to execute and data to process in order to execute the processes of one or more implementations. The bus 208 also couples the router 200 to a network (e.g., 160 of FIG. 1) through the network interface 216. The frame processor 218 can create and modify various frames and packets discussed herein. The beamforming module 206 is capable of generating a beamformed frame for transmission to the stations (e.g., 120, 130, 140, or 150 of FIG. 1) via the network interface 216.

In one or more implementations, the network interface 216 transmits an MU frame to a number of stations (e.g., 120, 130, 140, and/or 150 of FIG. 1). The additional sounding-field is added to the MU frame by the frame processor 218. The additional sounding-field includes an MU-MIMO LTF sequence, which is added at an end of the MU frame. The MIMO-LTF sequence includes a VHT-LTF. The additional sounding-field can further include a VHT-STF sequence that is added before the VHT-LTF sequence. The MU frame is a first one of a number of MU frames that are transmitted sequentially by the network interface 216. In some aspects, the rest of the MU frames may or may not include the additional sounding-field.

The beamforming module 206 beamforms the MU frame to enable a corresponding one of the stations to receive an intended stream at high power. In some aspects, the beamforming module 206 does not beamform the VHT-LTF and the VHT-STF sequences that are added at the end of the MU frame.

According to the implementations of the subject technology, the network interface 216 does not transmit sounding frames before each sequence of MU frames, and only transmits the sounding frame at an initialization stage. The sounding frames include NDPA, NDP, and associated polling sequences. Instead of transmitting the sounding frames before each sequence of MU frames, the network interface 216, as discussed above, transmits a MU frame that ends with the additional sounding-field. In response to transmission of the MU frame with the additional sounding-field, the network interface 216 receives, from at least some of the stations, ACK responses (e.g., ACK frames) that each includes a sounding response frame. The sounding response can include channel feedback that can be based upon the additional sounding-field. The feedback includes quantized channel state information (CSI) feedback that is estimated by the station. In some aspects, the beamforming module 206 utilizes the CSI feedback to improve beamforming vectors, which can result in a spatial null at a station which is not an intended recipient of the stream that is being transmitted by the network interface 216.

In one or more implementations, the frame processor 218 includes signaling in the VHT-LTF sequence that identifies a station that has to include feedback in a corresponding sounding response frame. The signaling allows the station to decide when to include feedback in the corresponding sounding response frame.

Many of the above-described features and applications may be implemented as software processes that are specified as a set of instructions recorded on a computer readable storage medium (alternatively referred to as computer-readable media, machine-readable media, or machine-readable storage media). When these instructions are executed by one or more processing unit(s) (e.g., one or more processors, cores of processors, or other processing units), they cause the processing unit(s) to perform the actions indicated in the instructions. Examples of computer readable media include, but are not limited to, RAM, ROM, flash memory (e.g., SD cards, mini-SD cards, micro-SD cards, etc.), magnetic and/or solid state hard drives, ultra density optical discs, any other storage media. In one or more implementations, the computer readable media does not include carrier waves and electronic signals passing wirelessly or over wired connections, or any other ephemeral signals. For example, the computer readable media may be entirely restricted to tangible, physical objects that store information in a form that is readable by a computer. In one or more implementations, the computer readable media is non-transitory computer readable media, computer readable storage media, or non-transitory computer readable storage media.

While the above discussion primarily refers to microprocessor or multi-core processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

Figure 3:
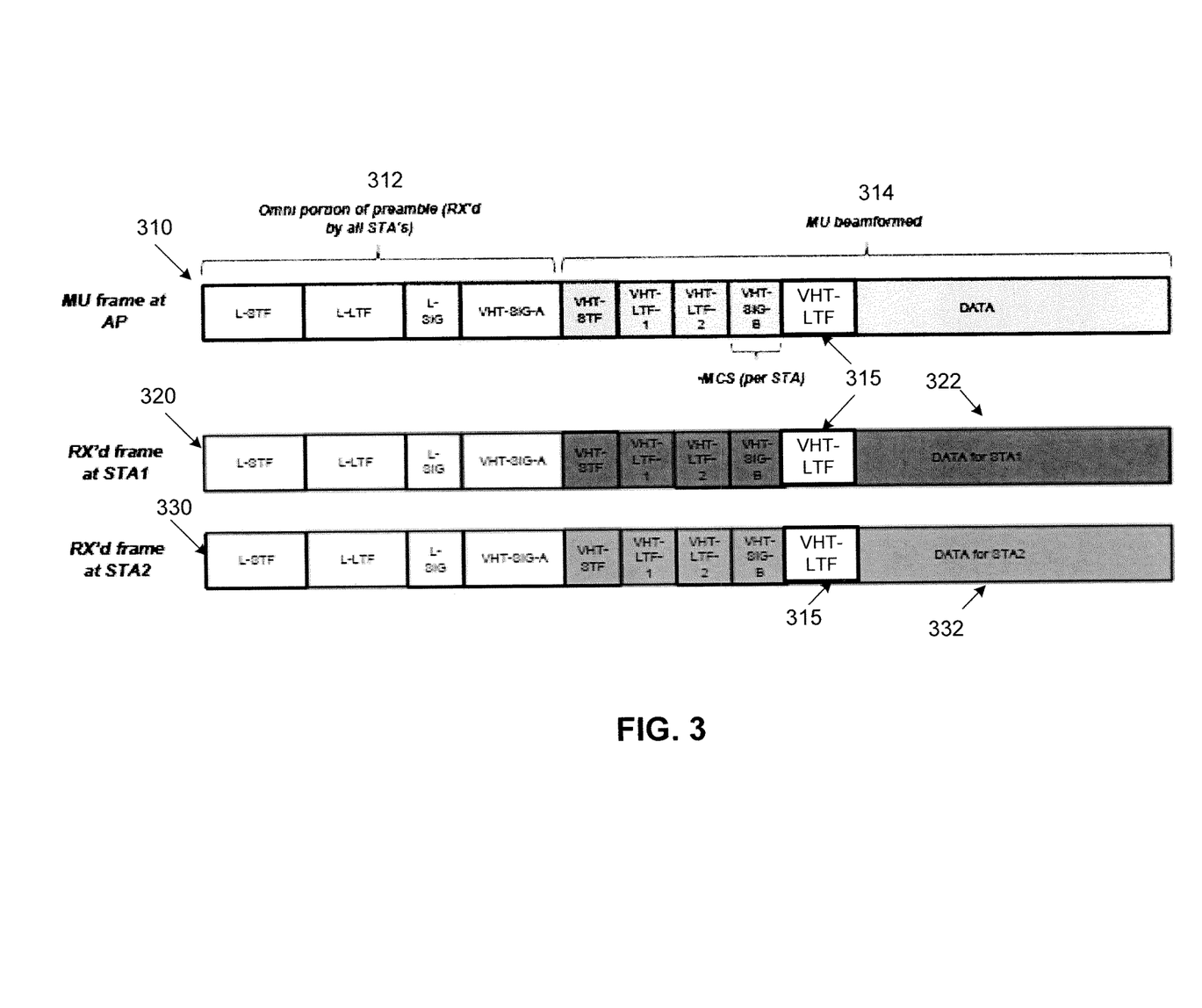
FIG. 3 illustrates an example of MU-frames exchanged between a router and at two stations in accordance with one or more implementations.

FIG. 3 illustrates an example of MU-frames 310, 320, and 330 exchanged between a router and two stations in accordance with one or more implementations of the subject technology. The router 110 of FIG. 1 (or 200 of FIG. 2) may send the MU frame 310 to one or more stations (e.g., 120, 130, 140, and 150 of FIG. 1). The MU frame 310 includes a preamble with an omni portion 312, which is not beamformed and can be received by all stations. The MU frame 310 further includes a beamformed portion 314, which is for receiving by one or more intended stations only. In other words, with a good choice of beamforming vectors by the beamforming module 206 of FIG. 2, only intended stations can see the beamformed portion 314.

The omni portion 312 may include a number of training fields such as legacy-STF (L-STF), legacy-LTF (L-LTF), legacy-signal (L-SIG), and additional signaling in the form of very-high-throughput SIG-A (VHT-SIG-A) fields, which are defined in the IEEE 802.11ac standard. The L-STF field, for example, may be used by a receiver (e.g., a station) to perform time and frequency synchronization with the signal, so that the rest of the field can be correctly decoded. The station may use the L-LTF field to fine tune timing adjustments after the initial course acquisition in the L-STF. The SIG fields include information on the length of the frame. The additional signaling in the MU frame (e.g., the VHT-SIG-A) field indicates whether or not the recipient device of the plurality of the devices has to provide a sounding response in addition to an ACK response. The VHT-SIG-A field further includes the channel bandwidth, number of spatial streams, modulation and coding scheme (MCS) information for single-user MIMO) and other data for use in demodulating the frame. This field may be transmitted as 20-MHz symbols, replicated over all underlying 20-MHz channels.

The beamformed portion 314 includes VHT-STF, VHT-LTF-1, VHT-LTF-2, VHT-SIG-B fields (e.g., sequences), a VHT-LTF field 315, and a data field. The VHT-STF field is used so that the receiver can normalize the orthogonal frequency-division multiplexing (OFDM) subcarriers in the subsequent transmission. To allow for non-contiguous 160-MHz channels, the field is repeated in each 80-MHz channel, VHT-LTF fields are included per spatial stream to be used for transmission. For example, the VHT-LTF-1 and VHT-LTF-2 of the frame 310 are for transmission of two spatial streams to two stations. The LTF fields allow the receiver to calculate the multipath characteristics of the channel and apply them to the MIMO algorithm. The VHT-LTF field 315 is an additional sounding field that includes an MU-MIMO LTF sequence and is a feature of the subject technology as discussed herein.

The frames 320 and 330 are the frames as received at the two intended stations (e.g., STA1 and STA2) and each include a corresponding data field (e.g., 321 and 332) intended to be received with that station.

Figure 4A:
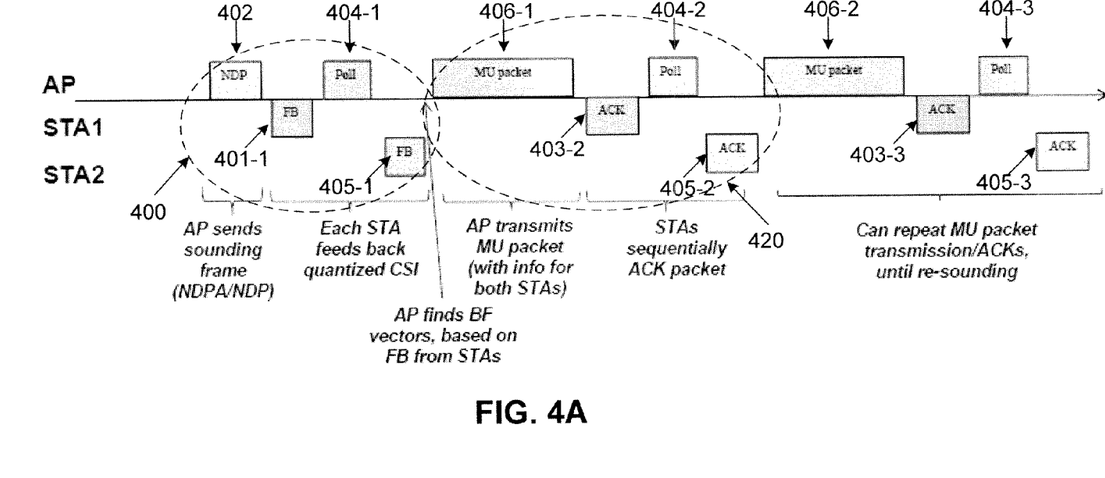
FIGS. 4A-4B illustrate examples of MU-MIMO frame exchanges.

FIG. 4A illustrates an example of a MU-MIMO frame exchange. The example MU-MIMO frame exchange, as shown, is between a router (e.g., an access point (AP) such as 200 of FIG. 2, or 110 of FIG. 1) and two MU-MIMO stations (e.g., a first station STA1 and as second station STA2) such as the stations 120, 130, 140 or 150 of FIG. 1. In an NDP-feedback-poll exchange 400, initially, the router sends an NDP frame 402, in response to which, the first station sends a channel feedback frame 401-1. The feedback frame 401-1 includes quantized CSI of the communication channel between the router and the first station, which can be used by the router to determine beamforming (BF) vectors that are optimum for the first station. The other stations, for example, the second station, do not respond to the NDP frame 402 and wait for a request by a polling frame from the router to send their feedback. For example, the router has to send the polling frame 404-1 to receive the feedback frame 405-1 from the second station.

Figure 4B:
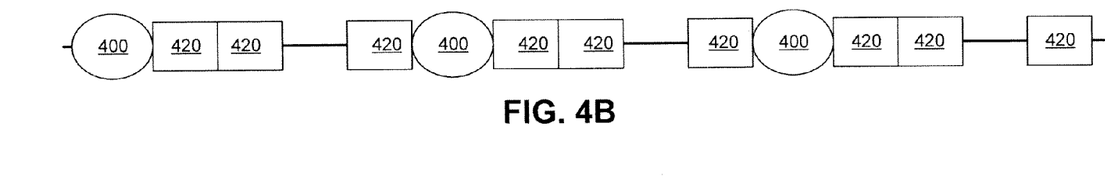

Following receiving the feedback frame 405-1 from the second station, an MU-frame-ACK exchange 420 starts, in which the router sends the first MU frame 406-1 (e.g., similar to 310 of FIG. 3), in response to which, the first station sends the ACK frame 403-2. The second station, however, waits to receive the polling frame 404-2 from the router before sending the ACK frame 405-2. Similarly, when the router sends the next MU frame 406-2, the first station sends the ACK frame 403-3, whereas, the second station waits for a polling frame 404-3 to be received from the router before responding to it by sending the ACK frame 405-3. The exchange of MU frames, the following polling frame and the ACK frames, as discussed above, repeats until the next sounding (e.g., transmission of another NDP frame by the router). As seen in FIG. 4B, the existing practice consist of an NDP-feedback-poll exchange 400, followed by multiple MU frame-ACK exchanges 420, then another NDP-feedback-poll exchange 400, followed by another multiple MU frame-ACK exchanges 420, and so on. The substantial duration (e.g., 1 millisecond) of the NDP-feedback-poll exchange 400 and the fact that, in the existing practice, the exchange has to be repeated frequently (e.g., every 10 milliseconds) can lead to consumption of substantial air time by the channel feedback process.

Figure 4C:
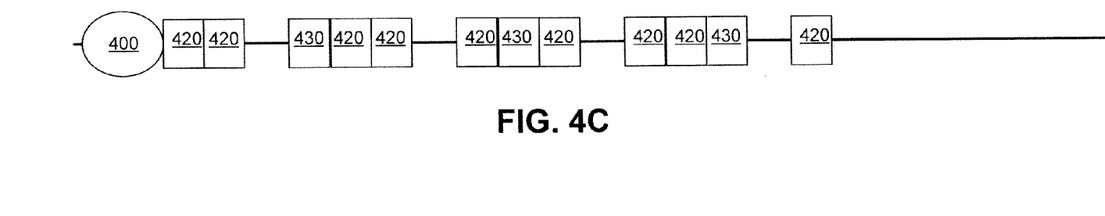
FIGS. 4C-4D illustrate examples of MU-MIMO frame exchanges with improved protocol efficiency in accordance with one or more implementations.
Figure 4D:
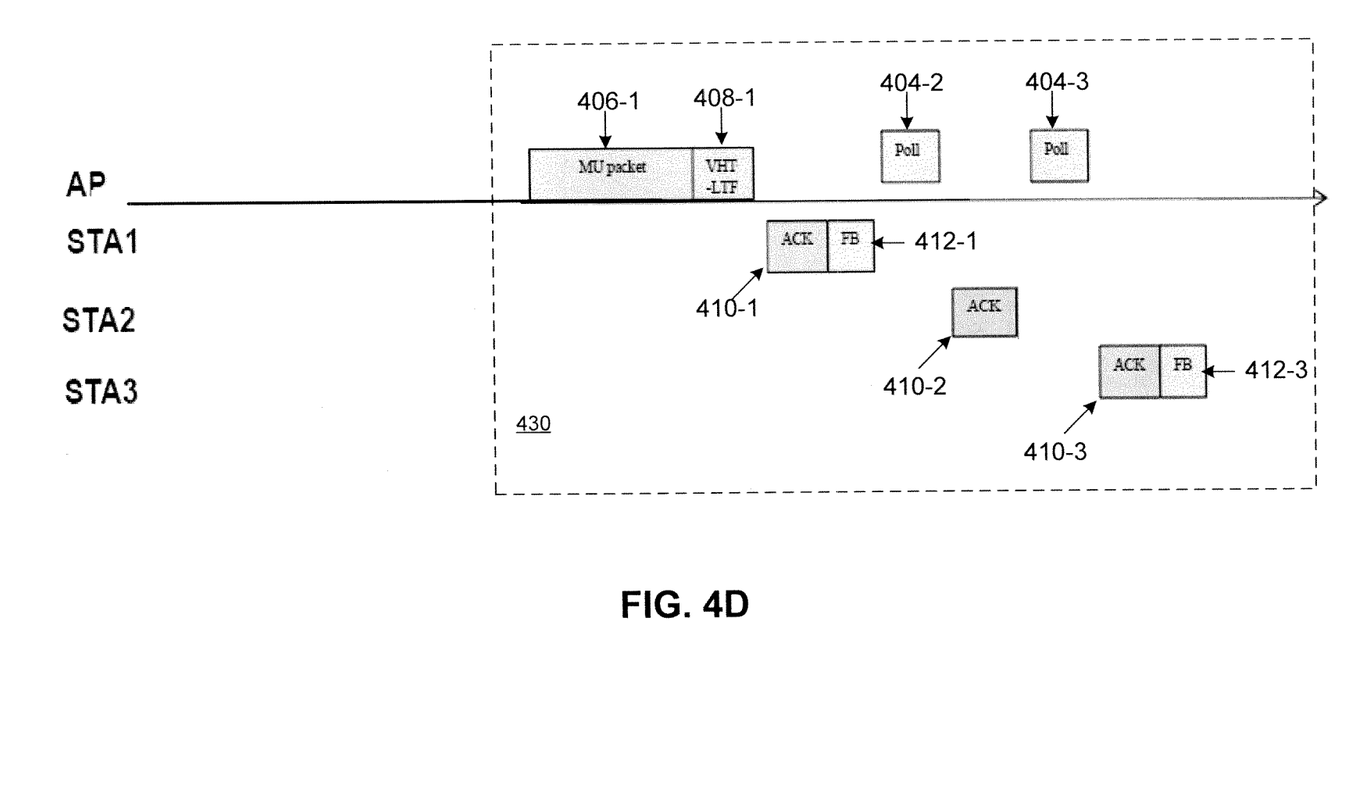

FIGS. 4C-4D illustrate as example of MU-MIMO frame exchanges with improved protocol efficiency in accordance with one or more implementations of the subject technology. The subject technology, as shown in FIG. 4C, drastically reduce this air-time consumption, by eliminating the NDP-feedback-poll exchange 400, except at initialization and replacing the MU frame-ACK exchanges 420 with more compact MU frame-ACK exchanges 430, as described below. The NDP-feedback-poll exchange 400, including transmission of the NDP frame 402 and the polling frame 404-1 and reception of the feedback frames 401-1 and 405-1, is considered a significant overhead. It is understood that a substantial protocol efficiency improvement can be achieved by the removal of this overhead. The more compact MU frame-ACK exchanges 430 of the subject technology aggregates polling for ACK responses and polling with sounding responses together. As shown in FIG. 4D, an additional sounding-field 408-1 is added to the MU frame 406-1. The additional sounding-field 408-1 includes an MU-MIMO LTF sequence, which is added at an end of the MU frame 406-1. The MU MIMO-LTF sequence includes a very-high-throughput (VHT)-LTF, and in some implementations, a VHT-STF sequence as well. In some aspects, the additional sounding-field 408-1 is not beamformed or beam formed differently (e.g., using a different beamforming vector).

The additional sounding field or the frame's preamble includes signaling that identifies which station has to include feedback in a corresponding sounding response frame. For example, in FIG. 4B, the first station (STA1) and the third station (STA3) are identified by the signaling in the VHT-LTF sequence of the additional sounding-field 408-1 to provide feedback. In response, these stations combine the feedbacks 412-1 and 412-3 in their respective ACK responses 410-1 and 410-3, which are received by the router in response to the MU frame 406-1 and the polling frame 404-3. For example, the second station (STA2) is not identified by the signaling in the VHT-LTF sequence of the additional sounding-field 408-1 to provide feedback. In some implementations, the signaling allows each station to decide when to include feedback in the corresponding sounding response frame. The respective station can decide whether a previously sent feedback needs to be refreshed or not, and if refreshment is needed, a new feedback frame is attached to the next ACK frame. The MU frame 406-1 is a first one of a number of MU-frames (not shown in FIG. 4B for simplicity) that are transmitted sequentially, and the remaining MU frames may not need to include the additional sounding-field 408-1.

Figure 5:
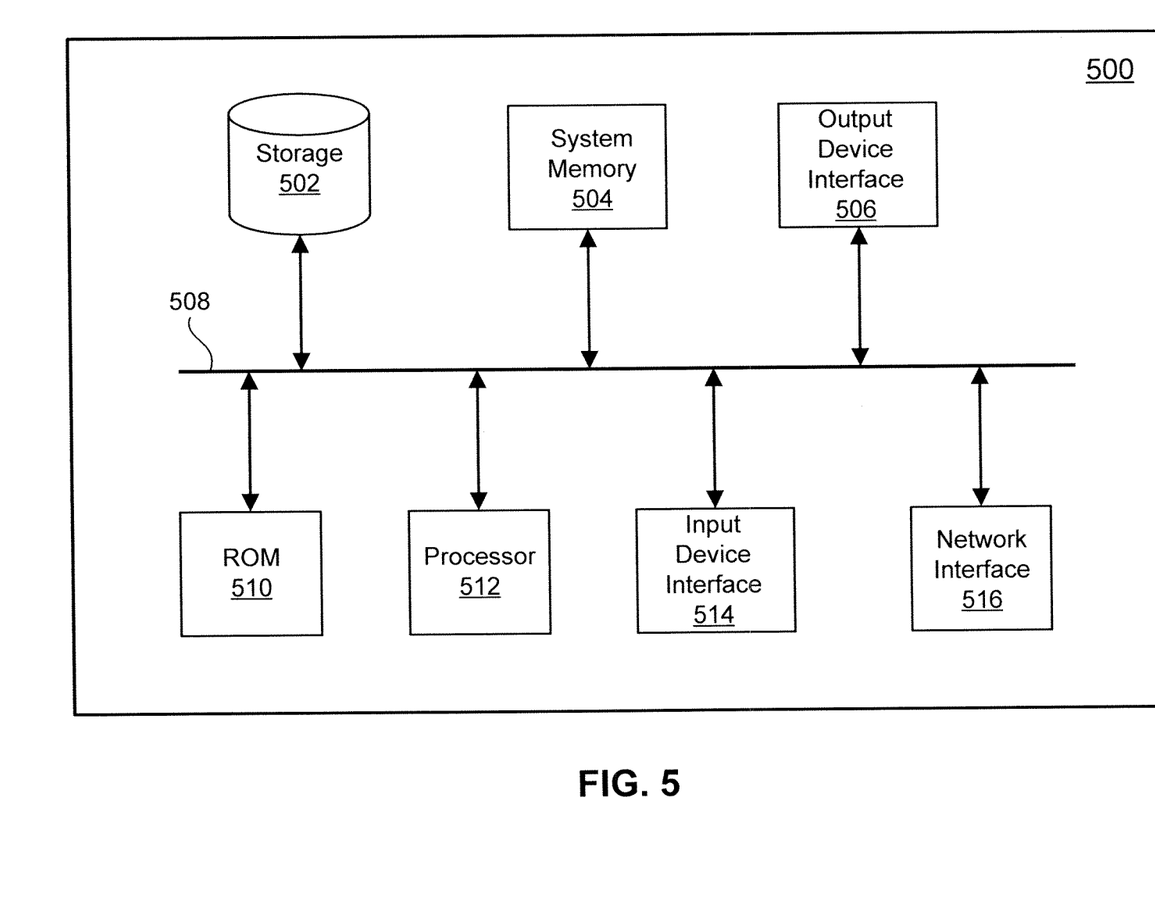
FIG. 5 conceptually illustrates an example of a station in communication with the router of FIG. 2 in accordance with one or more implementations.

FIG. 5 conceptually illustrates an example of a station 500 in communication with the router 200 of FIG. 2 in accordance with one or more implementations of the subject technology. The station 500 can be a hand-held communication device, a tablet computer, a laptop computer, or a desktop computer (e.g., 120, 130, 140, and 150 of FIG. 1), which are in communication with a router (e.g., 110 of FIG. 1). The station 500 can include various types of computer readable media and interfaces for various other types of computer readable media. The station 500 includes a bus 508, a processing unit(s) 512, a system memory 504, a read-only memory (ROM) 510, a permanent storage device 502, an input device interface 514, an output device interface 506, and a network interface 516, or subsets and variations thereof.

The bus 508 collectively represents all system, peripheral, and chipset buses that communicatively connect the numerous internal devices of the router 500. In one or more implementations, the bus 508 communicatively connects the processing unit(s) 512 with the ROM 510, the system memory 504, and the permanent storage device 502. From these various memory units, the processing unit(s) 512 retrieves instructions to execute and data to process in order to execute the processes of the subject disclosure. The processing unit(s) can be a single processor or a multi-core processor in different implementations.

The ROM 510 stores static data and instructions that are needed by the processing unit(s) 512 and other modules of the electronic system. The permanent storage device 502, on the other hand, is a read-and-write memory device. This device is a non-volatile memory unit that stores instructions and data even when the router 500 is off. One or more implementations of the subject disclosure use a mass-storage device (such as a magnetic or optical disk and its corresponding disk drive) as the permanent storage device 502.

Other implementations use a removable storage device (such as a floppy disk, flash drive, and its corresponding disk drive) as the permanent storage device 502. Like the permanent storage device 502, the system memory 504 is a read-and-write memory device. However, unlike the storage device 502, the system memory 504 is a volatile read-and-write memory, such as random access memory. The system memory 504 stores any of the instructions and data that the processing unit(s) 512 needs at runtime. In one or more implementations, the processes of the subject disclosure are stored in the system memory 504, the permanent storage device 502, and/or the ROM 510. From these various memory units, the processing unit(s) 512 retrieves instructions to execute and data to process in order to execute the processes of one or more implementations. The bus 508 also connects to the input and the output device interfaces 514 and 506. The input device interface 514 enables a user to communicate information and select commands to the electronic system. Input devices used with the input device interface 514 include, for example, alphanumeric keyboards and pointing devices (also called "cursor control devices"). The output device interface 506 enables, for example, the display of images generated by the station 500. The output devices used with output device interface 506 include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 5, the bus 508 also couples the station 500 to a network (e.g., 160 of FIG. 1) through the network interface 516. In this manner, the station 500 can be a part of a network of computers (such as a local area network ("LAN"), a wide area network ("WAN"), or an Intranet, or a network of networks, such as the Internet. Any or all components of the station 500 can be used in conjunction with the subject disclosure.

In some embodiments, the network interface 516 receives an MU frame (e.g., 406-1 of FIG. 4B), which is beamformed to enable the satiation 500 to receive an intended stream at high power, whereas, other devices (e.g., stations) receive the intended stream at a low power. The MU frame includes an additional sounding-field (e.g., 408-1 of FIG. 4B), as discussed with respect to FIG. 4B. The MU frame is a first one of multiple MU frames that are received sequentially. The remaining of the MU frames may not include the additional sounding-field. The MU frames are received from a router (e.g., an access point such as 200 of FIG. 2). The network interface 516 sends, in response to receiving the MU frame, an ACK response (e.g., an ACK frame) that includes a sounding response frame. The sounding response frame includes a channel feedback, which includes quantized channel state information (CSI) feedback.

In some aspects, at least some of the stations do not include the sounding response frame including the feedback in their corresponding ACK responses. At least one of the other stations, which are disabled from receiving the intended stream at the high power, may be requested to measure a corresponding channel and to provide feedback to the router. The station that is requested to provide the feedback to the router can be a station that the router intends to include in the recipients of a future MU frame of the multiple MU frames that are to be transmitted by the router.

Many of the above-described features and applications may be implemented as software processes that are specified as a set of instructions recorded on a computer readable storage medium (alternatively referred to as computer-readable media, machine-readable media, or machine-readable storage media). When these instructions are executed by one or more processing unit(s) (e.g., one or more processors, cores of processors, or other processing units), they cause the processing unit(s) to perform the actions indicated in the instructions. Examples of computer readable media include, but are not limited to, RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ultra density optical discs, any other optical or magnetic media, and floppy disks. In one or more implementations, the computer readable media does not include carrier waves and electronic signals passing wirelessly or over wired connections, or any other ephemeral signals. For example, the computer readable media may be entirely restricted to tangible, physical objects that store information in a form that is readable by a computer. In one or more implementations, the computer readable media is non-transitory computer readable media, computer readable storage media, or non-transitory computer readable storage media.

In one or more implementations, a computer program product (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

While the above discussion primarily refers to microprocessor or multi-core processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

Figure 6:
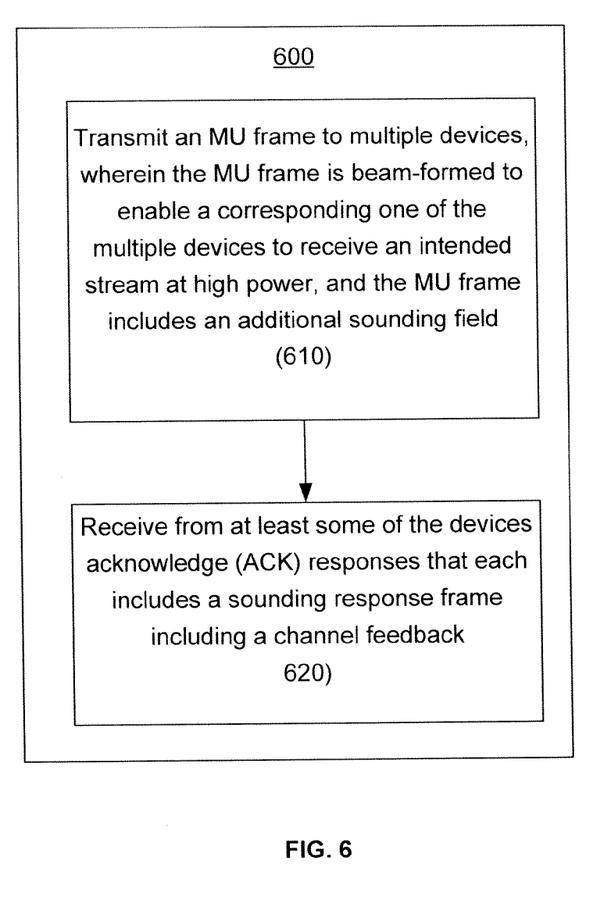
FIG. 6 illustrates an example of a method for communicating, from a router, MU-MIMO frames with improved protocol efficiency in accordance with one or more implementations.

FIG. 6 illustrates an example of a method 600 for communicating, from a router (e.g., 200 of FIG. 2), MU-MIMO frames (e.g., 310 of FIG. 3) with improved protocol efficiency in accordance with one or more implementations of the subject technology. For explanatory purposes, the example method 600 is described herein with reference to, but is not limited to, the router 110 of FIG. 1 and router 200 of FIG. 2. Further for explanatory purposes, the blocks of the example method 600 are described herein as occurring in serial, or linearly. However, multiple blocks of the example method 600 can occur in parallel. In addition, the blocks of the example method 600 need not be performed in the order shown and/or one or more of the blocks of the example method 600 need not be performed.

In one or more implementations, an MU frame (e.g., 406-1 of FIG. 4B) is transmitted to multiple devices (e.g., 120, 130, 140, and 150 of FIG. 1 or STA1, STA2, and STA3 of FIG. 4B), wherein the MU frame is beamformed (e.g., by 206 of FIG. 2) to enable a corresponding one of the devices to receive an intended stream at high power, and the MU frame includes an additional sounding-field (e.g., 408-1 of FIG. 4B) (610). Acknowledgement (ACK) responses (e.g., 410-1 and 410-3 of FIG. 4B) that each include a sounding response frame including feedback (e.g., 412-1 or 412-3 of FIG. 4B) are received, from at least some of the devices (e.g., STA1 and STA3 of FIG. 4B) (620).

Figure 7:
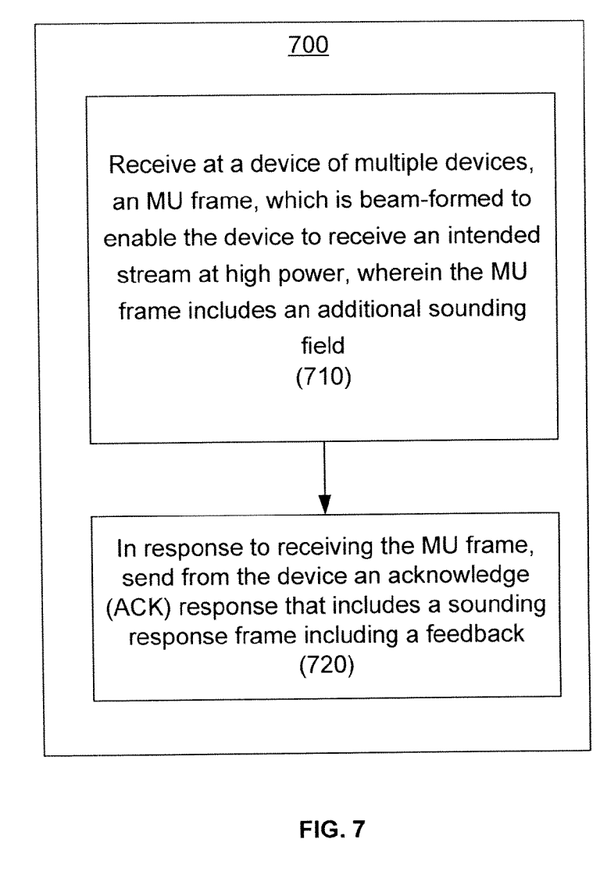
FIG. 7 illustrates an example of a method for receiving, from a router, MU-MIMO frames with improved protocol efficiency in accordance with one or more implementations.

FIG. 7 illustrates an example of a method 700 for receiving, from a router (e.g., 200 of FIG. 2), MU-MIMO frames (e.g., 406-1 of FIG. 4B) with improved protocol efficiency in accordance with one or more implementations of the subject technology. For explanatory purposes, the example method 700 is described herein with reference to, but is not limited to, the station 500 of FIG. 5 and STA1, STA2, and STA3 of FIG. 4B. Further for explanatory purposes, the blocks of the example method 700 are described herein as occurring in serial, or linearly. However, multiple blocks of the example method 700 can occur in parallel. In addition, the blocks of the example method 700 need not be performed in the order shown and/or one or more of the blocks of the example method 700 need not be performed.

In one or more implementations, an MU frame (e.g., 406-1 of FIG. 4B), which is beamformed is received. The MU frame is beamformed to enable a station (e.g., 120 of FIG. 1 or station STA1 of FIG. 4B) of multiple devices (e.g., stations 120, 130, 140, or 150 of FIG. 1, or stations STA1, ST2, or STA3 of FIG. 4B) to receive an intended stream at high power, and to disable the other stations from receiving the intended stream at the high power; the MU frame includes an additional sounding-field (e.g., 408-1 of FIG. 4B) (710). In response to receiving the MU frame, the device (e.g., STA1 of FIG. 4B) sends an acknowledgement (ACK) response (e.g., 410-1 of FIG. 4B) that includes a sounding response frame including feedback (e.g., 412-1 of FIG. 4B) (720).

Those of skill in the art would appreciate that the various illustrative blocks, modules, elements, components, and methods described herein can be implemented as electronic hardware, computer software, or combinations of both. To illustrate this interchangeability of hardware and software, various illustrative blocks, modules, elements, components, and methods have been described above generally in terms of their functionality. Whether such functionality is implemented as hardware or software depends upon the particular application and design constraints imposed on the overall system. Skilled artisans can implement the described functionality in varying ways for each particular application. Various components and blocks can be arranged differently (e.g., arranged in a different order, or partitioned in a different way) all without departing from the scope of the subject technology.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

A phrase such as "an aspect" does not imply that such aspect is essential to the subject technology or that such aspect applies to all configurations of the subject technology. A disclosure relating to an aspect can apply to all configurations, or one or more configurations. An aspect can provide one or more examples of the disclosure. A phrase such as an "aspect" refers to one or more aspects and vice versa. A phrase such as an "embodiment" does not imply that such embodiment is essential to the subject technology or that such embodiment applies to all configurations of the subject technology. A disclosure relating to an embodiment can apply to all embodiments, or one or more embodiments. An embodiment can provide one or more examples of the disclosure. A phrase such an "embodiment" can refer to one or more embodiments and vice versa. A phrase such as a "configuration" does not imply that such configuration is essential to the subject technology or that such configuration applies to all configurations of the subject technology. A disclosure relating to a configuration can apply to all configurations, or one or more configurations. A configuration can provide one or more examples of the disclosure. A phrase such as a "configuration" can refer to one or more configurations and vice versa.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein can be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method for improving multiple-user (MU) multiple-input-multiple-output (MIMO) protocol efficiency, the method comprising:
   transmitting an MU frame to a plurality of devices, wherein the MU frame is beamformed to enable a corresponding one of the plurality of devices to receive an intended stream at high power, and the MU frame includes an additional sounding-field comprising a very-high-throughput (VHT)-LTF sequence that is beamformed differently using a different beamforming vector; and
   receiving, from at least some of the plurality of devices, an acknowledgement (ACK) response frame and a channel feedback that are combined together.

2. The method of claim 1, further comprising transmitting sounding frames including a null-data packet announcement (NDPA), a null-data packet (NDP), and associated polling sequences only at an initialization stage.

3. The method of claim 1, wherein the additional sounding-field comprises an MU-MIMO long-training field (LTF) sequence, wherein the MIMO-LTF sequence is added at an end of the MU frame.

4. The method of claim 1, wherein the additional sounding-field further comprises a VHT-short-training field (STF) sequence, wherein the VHT-STF sequence is added before the VHT-LTF sequence, and wherein the VHT-STF sequence is beamformed differently.

5. The method of claim 1, wherein the VHT-LTF sequence includes signaling that identifies a device of the plurality of devices that has to include feedback in a corresponding sounding response frame, wherein the signaling allows the device of the plurality of devices to decide when to include feedback in the corresponding sounding response frame.

6. The method of claim 1, wherein transmitting of the MU frame and receiving the ACK response frame is performed by a router, wherein each of the plurality of devices comprises one of a hand-held communication device, a tablet, a laptop, or a personal computer, wherein the MU frame comprises a first one of a plurality of MU frames that are transmitted sequentially, wherein the remaining ones of the plurality of MU frames do not include the additional sounding-field.

7. The method of claim 1, wherein the feedback includes quantized channel state information (CSI) feedback, and the method further comprises utilizing the CSI feedback to improve beamforming vectors, and wherein improving beamforming vectors results in a spatial null at each device of the plurality of devices for the stream that is not intended for that device.

8. A method for improving multiple-user (MU) multiple-input-multiple-output (MIMO) protocol efficiency, the method comprising:
   receiving, at a device of a plurality of devices, an MU frame, which is beamformed to enable the device of the plurality of devices to receive an intended stream at high power, and to disable the other devices of the plurality of devices from receiving the intended stream at the high power, wherein the MU frame includes an additional sounding-field comprising a very-high-throughput (VHT)-LTF sequence that is beamformed differently using a different beamforming vector; and in response to receiving the MU frame, sending, from the device of the plurality of devices, an acknowledgement (ACK) response frame and a channel feedback that are combined together.

9. The method of claim 8, receiving the MU frame comprises receiving the MU frame from a router, and wherein the MU frame comprises a first one of a plurality of MU frames that are received sequentially, wherein the remaining of the plurality of MU frames do not include the additional sounding-field.

10. The method of claim 9, wherein at least some of the devices of the plurality of devices do not send the channel feedback combined with a respective ACK response frame, wherein at least one of the other devices of the plurality of devices, which are disabled from receiving the intended stream at the high power, is requested to measure a respective channel and to provide feedback to the router, wherein the at least one of the other devices of the plurality of devices that is requested to provide feedback to the router is intended to receive an MU frame of the plurality of MU frames.

11. A device for improving multiple-user (MU) multiple-input-multiple-output (MIMO) protocol efficiency, the device comprising:

a beamforming module configured to beamform an MU frame; and a network interface configured to:

transmit the MU frame to a plurality of devices; and receive, from at least some of the plurality of devices, an acknowledgement (ACK) response frame and a channel feedback that are combined together, the MU frame is beamformed to enable a corresponding one of the plurality of devices to receive an intended stream at high power, and the MU frame includes an additional sounding-field comprising a very-high-throughput (VHT)-LTF sequence that is beamformed differently using a different beamforming vector.

12. The device of claim 11, wherein the network interface is further configured to transmit sounding frames including a null-data packet announcement (NDPA), a null-data packet (NDP), and associated polling sequences only at an initialization stage.

13. The device of claim 11, further comprising a frame processor, wherein the frame processor is configured to add the additional sounding-field that comprises an MU-MIMO long-training field (LTF) sequence, wherein the frame processor is configured to add the MIMO-LTF sequence at an end of the MU frame.

14. The device of claim 11, wherein the frame processor is configured to add the additional sounding-field to the MU frame, wherein the additional sounding-field further comprises a VHT-short-training field (STF) sequence, wherein the frame processor is configured to add the VHT-STF sequence before the VHT-LTF sequence, wherein the beamforming module is configured to beamform the VHT-STF sequence differently.

15. The device of claim 11, wherein the VHT-LTF sequence includes signaling that identifies a device of the plurality of devices that has to include feedback in a corresponding sounding response frame, wherein the signaling allows the identified device of the plurality of devices to decide when to include feedback in the corresponding sounding response frame.

16. The device of claim 11, wherein the device comprises a router, wherein each of the plurality of devices comprises one of a hand-held communication device, a tablet, a laptop, or a personal computer, wherein the MU frame comprises a first one of a plurality of MU frames that are transmitted sequentially, wherein the remaining one of the plurality of MU frames do not include the additional sounding-field.

17. The device of claim 11, wherein the feedback includes quantized channel state information (CSI) feedback, and wherein the beamforming module is further configured to utilize the CSI feedback to improve beamforming vectors, and wherein improving beamforming vectors results in a spatial null at each device of the plurality of devices for the stream that is not intended for that device.

18. A device for improving multiple-user (MU) multiple-input-multiple-output (MIMO) protocol efficiency, the device comprising:

a radio frequency antenna; and a network interface configured to:

receive an MU frame, which is beamformed to enable the device to receive an intended stream at high power; and send, in response to receiving the MU frame, an acknowledgement (ACK) response frame and a channel feedback that are combined together, wherein:

the device comprises a device of a plurality of devices, beamforming disables other devices of the plurality of devices from receiving the intended stream at the high power, and the MU frame includes an additional sounding-field comprising a very-high-throughput (VHT)-LTF sequence that is beamformed differently using a different beamforming vector.

19. The device of claim 18, wherein the network interface is configured to receive the MU frame from a router, and wherein the MU frame comprises a first one of a plurality of MU frames that are received sequentially, wherein the remaining ones of the plurality of MU frames do not include the additional sounding-field.

20. The device of claim 19, wherein at least some of the devices of the plurality of devices do not send the channel feedback combined with a respective ACK response frame, wherein at least one of the other devices of the plurality of devices, which are disabled from receiving the intended stream at the high power, is requested to measure a respective channel and to provide feedback to the router, wherein the at least one of the other devices of the plurality of devices that is requested to provide feedback to the router is intended to receive an MU frame of the plurality of MU frames.

* * * * *